United States Patent [19]
Oehler

[11] 3,719,299
[45] March 6, 1973

[54] PALLET TYPE LOAD TRANSPORT APPARATUS

[76] Inventor: Carl W. Oehler, 1664 S.E. 4th Court, Deerfield Beach, Fla. 33441

[22] Filed: Aug. 5, 1970

[21] Appl. No.: 61,228

[52] U.S. Cl. ............214/515, 254/93 HP, 280/404, 280/423 R
[51] Int. Cl. .................................................B60p 1/64
[58] Field of Search.214/512, 515; 254/93 HP, 86 H; 296/28 M; 280/404, 423 R; 52/579, 588

[56] References Cited

UNITED STATES PATENTS

| | | | |
|---|---|---|---|
| 2,026,278 | 12/1935 | Higley | 52/579 |
| 2,070,960 | 2/1937 | Phillips | 25/93 HP |
| 2,847,137 | 8/1958 | Stringfellow | 214/515 |
| 3,010,698 | 11/1961 | Allen et al. | 254/93 HP |
| 3,087,744 | 4/1963 | Tanenbaum | 280/404 |
| 3,380,758 | 4/1968 | Granning | 280/425 R |

Primary Examiner—Albert J. Makay
Attorney—Oldham & Oldham

[57] ABSTRACT

A combination tractor-trailer and pallet load carrying assembly is provided. The trailer and tractor fifth wheel both have vertically movable, controllable, load support or lift means associated therewith and the pallet has removable or retractable load support members thereon whereby the tractor-trailer can be moved under the pallet, the lifting device raised, and the pallet lifted for load transport action. The trailer is of a center pole type and is pivotally connected to the tractor.

12 Claims, 12 Drawing Figures

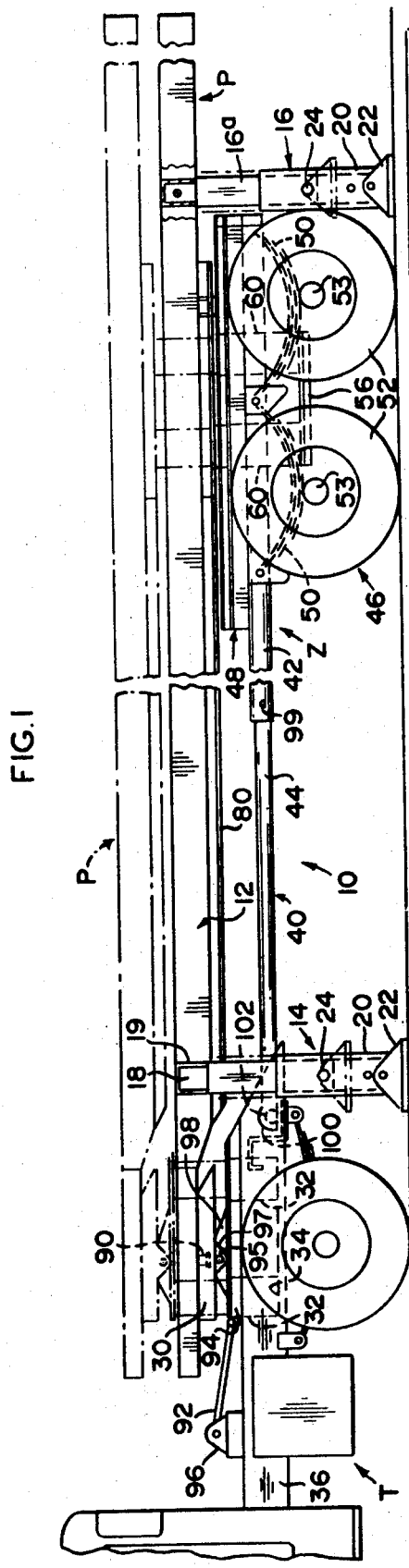
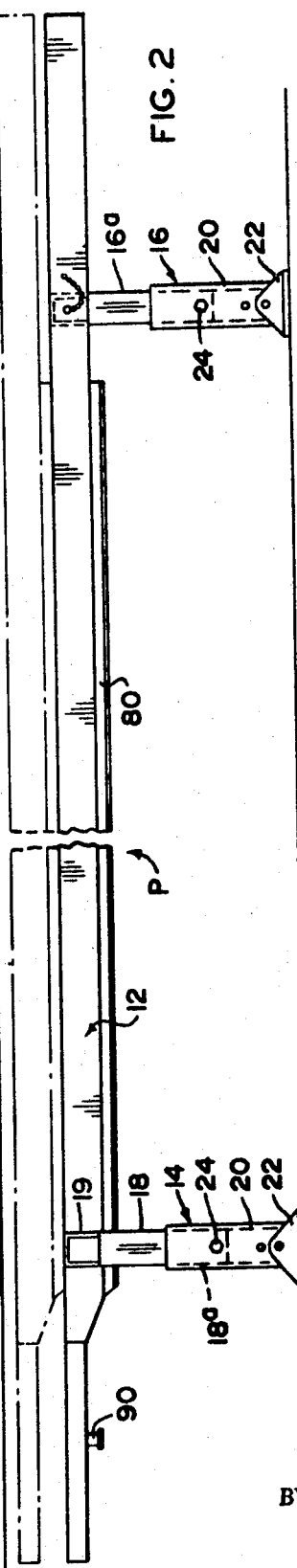
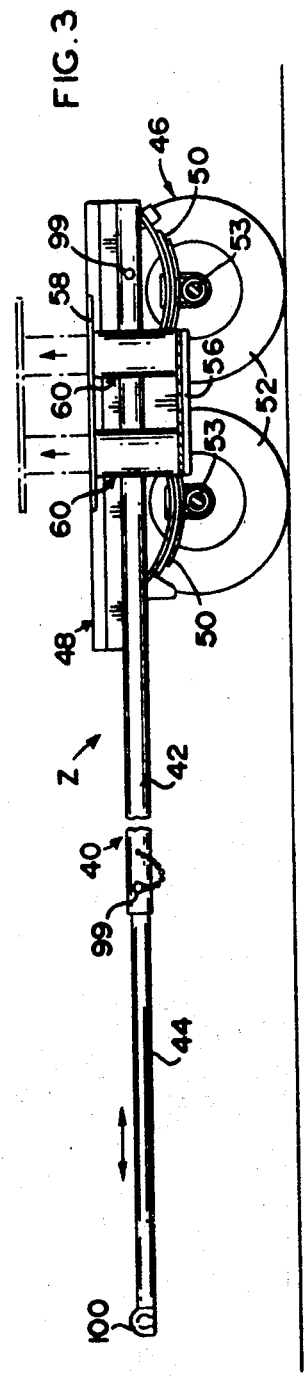

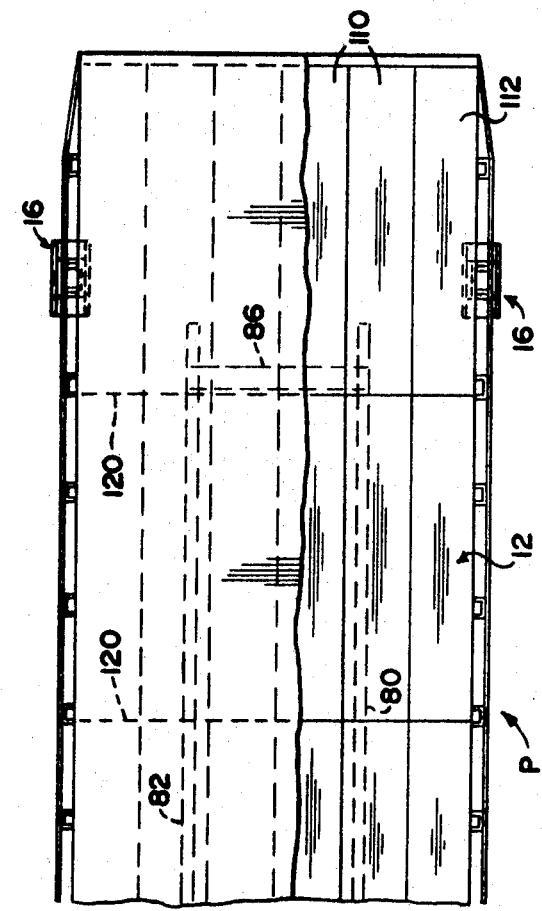
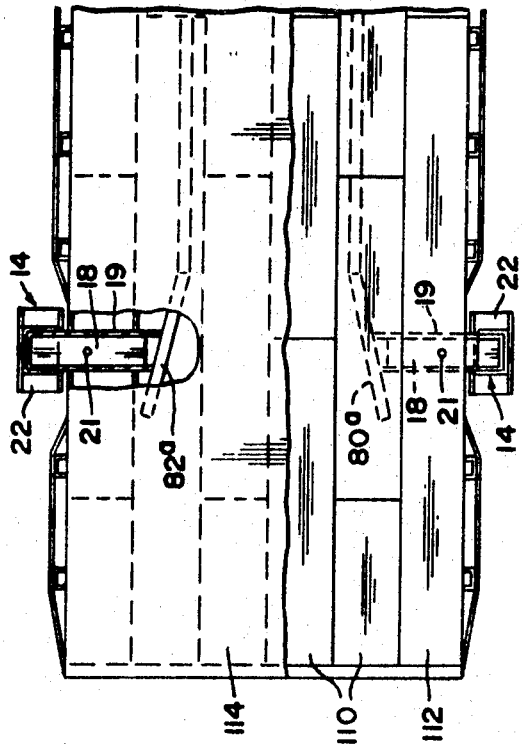
FIG. 4
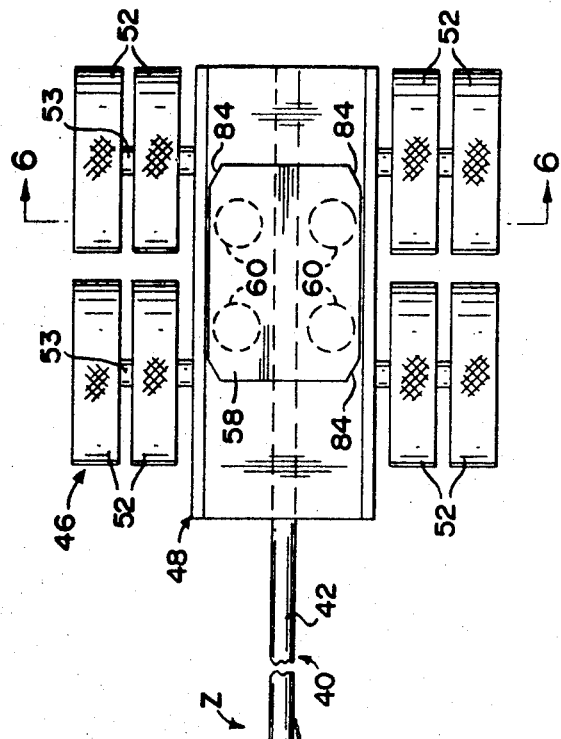
FIG. 5

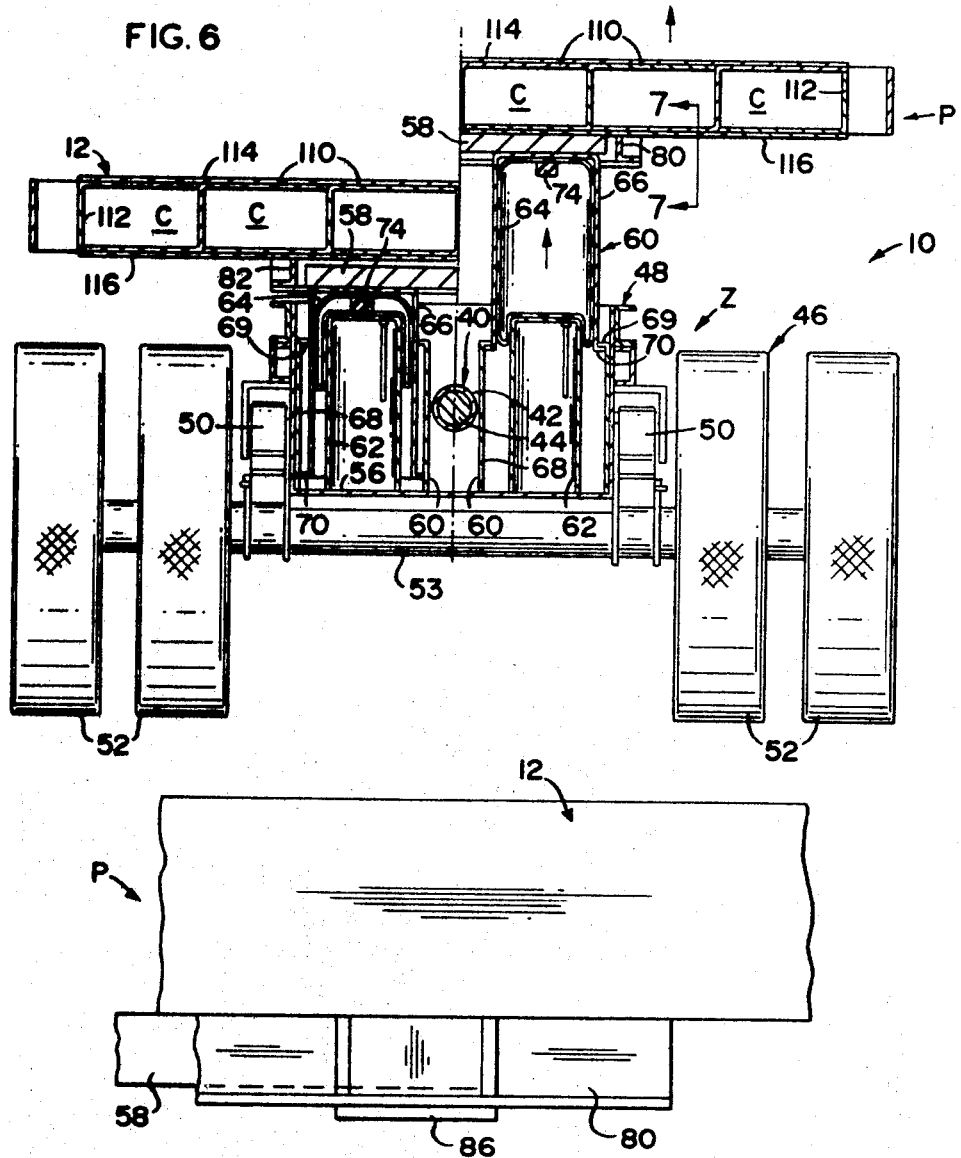

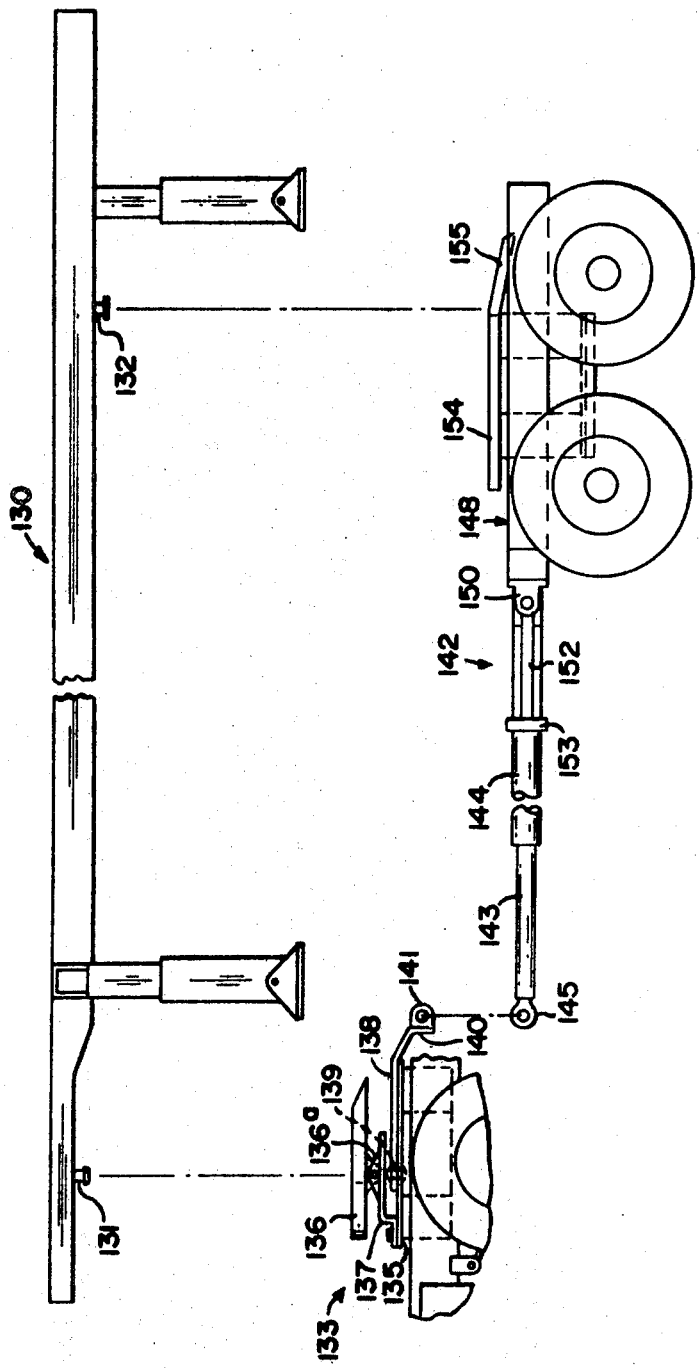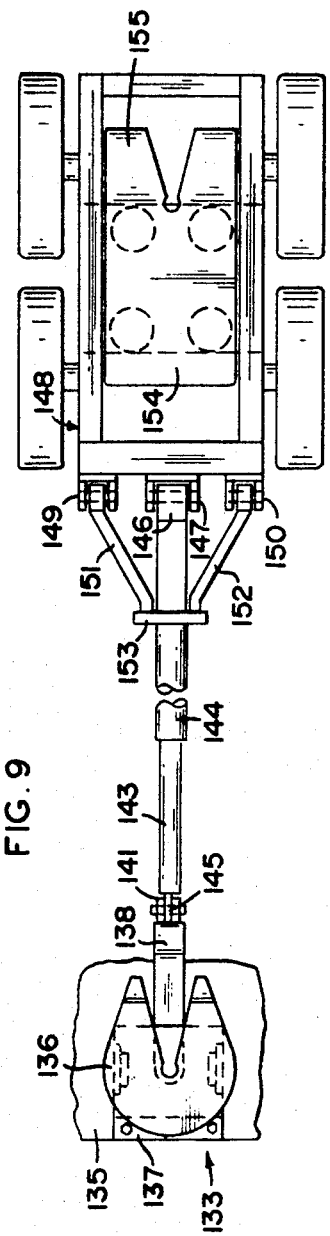
FIG. 8
FIG. 9
INVENTOR.
CARL W. OEHLER
BY
Oldham & Oldham
ATTORNEYS.

PALLET TYPE LOAD RANSPORT APPARATUS

The present invention relates to pallet type load support and load transport apparatus, and is particularly concerned with the provision of relatively inexpensive, sturdy pallets for load storage action, but wherein the novel tractor-trailer means of the invention can be moved under the pallet, the pallet raised from its support legs and be transported to a new site by the tractor-trailer at which place the load support means can be inoperatively positioned, the pallet be independently positioned, and the trailer moved away from the pallet for other action.

BACKGROUND OF THE INVENTION

Heretofore there have been various efforts made to provide different types of pallet type load transport and storage apparatus involving vertically adjustable load support means on a trailer and certain of such prior art is represented by U. S. Pat. Nos. 3,070,041 and 3,430,793. However, all of such apparatus, insofar as I am aware, has been quite special in nature, or limited in use, and has been relatively expensive to build and/or operate.

The general object of the present invention is to provide an improved, sturdy, relatively inexpensive pallet type load support and transport apparatus characterized by its use in conjunction with a pole type trailer having suitable lift means thereon.

Another object of the invention is to provide novel and improved lifting means for load support members provided in the trailer and wherein the elevation of the load support means can be readily controlled by conventional members provided in the trailer and associated apparatus.

Another object of the invention is to provide a relatively lightweight but sturdy pallet having retractable or removable load support legs, which pallet can be readily engaged with and moved by a tractor-trailer assembly of the invention.

Other objects of the invention are to provide novel and improved centering means to engage a pallet with a load transport and support trailer; to provide a sturdy, balanced lifting device control means for load support members in the trailer; to provide lift members in substantially conventional trailer assemblies which members are of a sturdy load support construction; to use any suitable power supply means for load control and lift action of a support pallet in relation to a pole trailer towed by the tractor; to provide an improved pole type trailer and load pallet combination; to improve the trailer movement of a pole type trailer when in use; to provide a segmented pole type trailer; and to provide a common center of rotation for a trailer and a pallet supported thereon.

The foregoing and other objects and advantages of the invention will be made more apparent as the specification proceeds.

This application will be described as air operated due to the convenient source of air pressure in a tractor-trailer but hydraulic, electric or mechanical power may be used for list and retraction actions.

Reference now is made to the accompanying drawings, wherein:

FIG. 1 is a side elevation of the tractor and trailer means in association with a pallet for load support and transport action and embodying the principles of the invention, with the elevated position of the pallet being indicated in dotted lines;

FIG. 2 is a side elevation of the load receiving pallet of FIG. 1;

FIG. 3 is a fragmentary side elevation of the trailer of FIG. 1;

FIG. 4 is a plan view of the pallet of FIG. 1;

FIG. 5 is a plan view of the trailer of FIG. 1;

FIG. 6 is a vertical section taken on line 6—6 of FIG. 5 with the retracted and elevated positions of the pallet and associated means being indicated;

FIG. 7 is an enlarged fragmentary vertical section taken on line 7—7 of FIG. 6;

Figure 10:
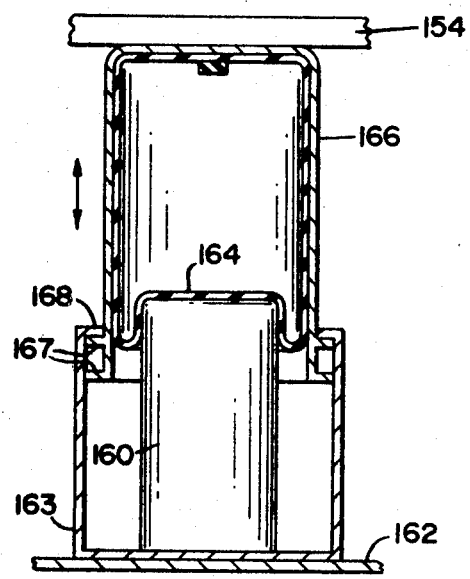
Figure 11:
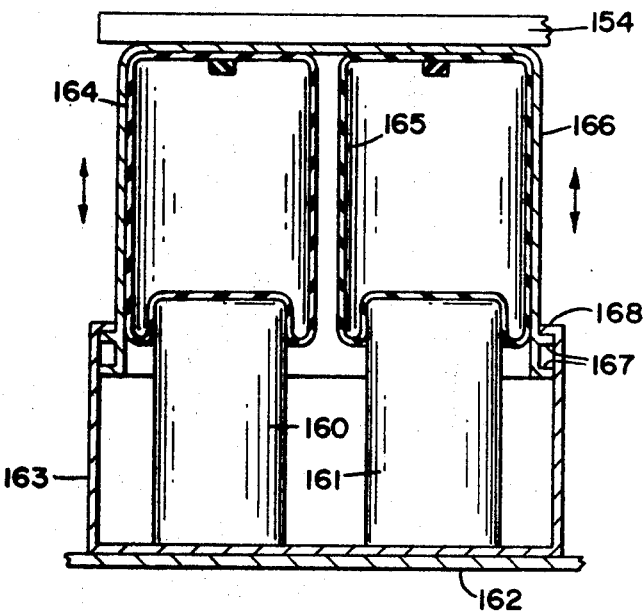

FIG. 8 of the drawings shows an exploded view of a diagrammatic showing of a modified embodiment of the invention;

FIG. 9 is a plan view of just the trailer-tractor combination of FIG. 8;

FIG. 10 is a fragmentary vertical section through one modified lifting means for use in practice of the invention;

FIG. 11 is a longitudinal section of the means shown in FIG. 10; and

Figure 12:
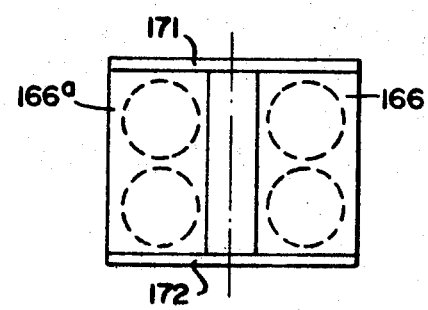

FIG. 12 is a fragmentary plan view to reduced scale of the apparatus of FIGS. 10 and 11 to illustrate the principles of operation thereof.

When referring to corresponding members shown in the specification and referred to in the drawings, corresponding numerals are used to facilitate comparison therebetween.

The pallet type load transport apparatus of the invention is indicated as a whole by the numeral 10 and it is formed from a load support and transfer pallet P used in association with a tractor T and a trailer Z.

The load support pallet P in general comprises an elongate plateform 12 which has a pair of removable load support legs 14 attached to marginal portions of the platform adjacent the front thereof and a pair of retractable and/or removable support legs 16 at the rear portion of the platform 12. These legs 14 are of L-shape and include an upper section 18 which is horizontally positioned and is slidably received in a channel or means 19 suitably provided in the platform 12. The means 19 is transversely directed at the lateral margins of the platform adjacent the front end thereof. The leg section or member 18 can be locked in position as by a pin or bolt 21 engaging suitable holes formed in the section 18 and means 19 to protrude laterally from the platform 12. The legs hence can be adjusted laterally to facilitate moving the trailer Z therebetween. The section or member 18 has a portion 18a that extends downwardly from the platform 12. A lower leg section 20 telescopically engages the portion 18a and has a pivotally positioned foot 22 secured to the lower end thereof. Any suitable member, such as a pin or bolt 24, can secure the lower leg section 20 to the portion 18a in vertically adjustable relationship thereto depending upon the height of load support required. The rear legs 16 have upper sections 16a which may be removably secured to suitable sockets in the platform 12 and lower leg sections 20 and feet 22 are also normally provided. However, the legs 16 may be of any known retractable or removable design. Normally the legs 14 would be disengaged from the pallet when it is elevated for load transport and the legs 16 or leg sections 20 thereof would be removed or be made inoperative during load transport. The legs 16 may be of any known retractable or removable design.

The tractor T has a conventional fifth wheel 30 secured thereto by means of a known design including a plurality of control cylinders 32 described hereinafter in more detail and which are supported by a cross plate or member 34 suitably secured to a frame 36 of the tractor.

The trailer Z comprises an adjustable length center pole 40 which is formed from a suitable elongate pneumatic or hydraulic cylinder including a casing 42 and a piston rod 44 retractably engaging the cylinder 42. The frame of a substantially conventional wheel assembly 46 is secured to the cylinder 42 adjacent a rear portion thereof in a suitable manner, and such wheel assembly includes a frame means 48 to which support springs 50, that operatively engage the wheels 52, are secured. Axles 53 connect respective pairs of the wheels 52. Any desired members secure the cylinder 42 to the frame 48 to form a unit therefrom. A centrally positioned subframe or cross plate means 56 is secured to the frame 48 and extends between marginal portions thereof below the cylinder 42, as shown in FIG. 3, to provide a suitable frame means for the wheel assembly unit. A lift and/or load support platform 58 is operatively secured to the cross plate 56 by a plurality, preferably four, vertically adjustable, cylindrical means, or air bag assemblies each indicated as a whole by the numeral 60. These air bag assemblies are positioned in balanced relationship longitudinally and transversely of the wheel assembly 46.

FIG. 6 of the drawings best shows that each of the air bag assemblies 60 comprises a fixed center or inner cylinder 62 and a flexible, inflatable air bag 64 the bottom portion of which is suitably secured to the upper end of the center cylinder 62. An outer or confining cylinder 66 telescopically and loosely engages each of the center cylinders 62 and it receives one of the air bags 64 therein. The outer cylinder 66 has a substantially greater inner diameter than the outer diameter of the center cylinder 62 whereby space is provided for retraction of sections or walls of the air bags 64 to double back into the space between the cylinders 62 and 66 when the cylinders are inoperative, or retracted, as indicated in the left side portion of FIG. 6. The center cylinders 62 are secured to the cross plate 56 and extend upwardly therefrom, while a second and outermost guide cylinder 68 is also suitably fixedly secured to this cross plate 56 in concentric relationship to the cylinders 62 and 66. Such outer cylinder 68 has a top inwardly extending flange 69 to engage with a bottom flange 70 provided at the lower end of the cylinder 66 whereby the confining cylinder 66 is guided or controlled to have reciprocating action on a vertical axis, but with the top flange 69 on the guide cylinder's upper end engaging the flange 70 to limit upward movement of the confining cylinder 66. The flange 70 slidably engages the cylinder 68 to limit or prevent lateral movement of the outer cylinder 66. The upper end of the confining cylinder 66 is suitably attached, as by welding, to the lower surface of the load support platform or plate 58 whereby such plate will be moved vertically upwardly and downwardly with inflation of the air bag assemblies 60. While not shown in detail on the drawings, these air bag assemblies 60 have conventional valve means provided therein whereby compressed air can be provided thereto through conventional coupling tubes normally extending from the tractor T and/or a compressed air supply tank attached to the trailer Z. Deflation of the bags 64 can occur by release of pressure from the bags 64 by the valves, or other conventional means provided.

So as to prevent damage to the air bags 64 when deflated, preferably each air bag has a resilient rubber or rubber-like block 74 secured to its upper inner surface and which block will operatively bottom against the adjacent upper end of the inner or center cylinder 62 when the air bag is deflated, so that a resilient bottoming action is provided and the air bag is not damaged when deflated.

Two of the air bag assemblies 60 are positioned on each side of the center pole 40 and provide controlled vertical movement of the support plate 58 on a vertical axis while maintained on a horizontal plane. Also, the air bag assemblies provide lateral stability for any load applied to the load support plate 58 when the trailer is being moved.

So as to facilitate engaging or centering the trailer Z with relation to the pallet P, the lower surface of the pallet P preferably has any suitable guide means thereon such as a pair of longitudinally extending, downwardly protruding, parallel guides or angles 80 and 82 secured thereto on the lower surface thereof. These guides are positioned far enough apart as to receive, readily, the load support plate 58 therebetween and they diverge at their front ends at 80a and 82a. Usually the ends of the load support plate 58 are beveled or angled as at 84 and such construction plus the diverging guides 80a and 82a facilitates sliding the load support plate in between the guides 80 and 82 when the trailer is backed in under the pallet. In addition, a cross bar or plate 86 is secured to the lower surfaces of the guides 80 and 82 and extends therebetween adjacent the rear ends thereof. Such cross plate 86 on the pallet will engage the rear end of the load support plate 58 and confines such plate whereby vertical movement of the pallet with relation to the trailer is prevented when the pallet P and plate 58 are operatively engaged but where some relative movement between the pallet and support plate 58 may occur in use.

Normally, a conventional king pin 90 is provided at the front end of the pallet P and is adapted to engage the fifth wheel plate 30 on the tractor to engage the pallet therewith when the tractor is backed in under the front end of the pallet. Then when the fifth wheel plate 30 is elevated, the front end of the pallet is ready for transport.

FIG. 1 of the drawings shows that a substantial conventional tractor T is provided for use in the apparatus of the invention. However, such tractor does have its fifth wheel plate 30 mounted in a special manner thereon by the use of the inflatable air bag assembly 32 referred to hereinbefore. Normally, a plurality, usually four, of these air bags are operably fixed between the fifth wheel plate 30 and the frame 36 of the tractor. These air bags can be of conventional construction and are available commercially. However, in order to facilitate positioning the fifth wheel plate 30 operably, a link 92 pivotally extends between a support plate 94 and a suitable bracket 96 that is secured to the tractor frame. This support plate 94 pivotally supports the fifth wheel plate 30 by a suitable pin 95 and other connecting means extending between adjacent flanges or brackets 97 and 98 provided on the lower surface of the fifth wheel plate and the upper part of the support plate 94, respectively, to aid in permitting adjusting movement of the fifth wheel during transit and when a pallet king pin is being engaged therewith or disengaged therefrom. The mechanism described provides the required stability for support of the front end of the pallet during load transport action and may be of the construction shown in U.S. Pat. No. 3,380,758, or one similar thereto.

The front end of the piston rod 44 has a conventional cup means 100 thereon which engages with a stem or ball 102 suitably secured to the tractor frame 36 at a rear portion thereof. Any desired lock means can be provided for retaining the cup 100 in engagement with the ball 102 whereby the trailer Z is pivotally secured to the tractor T for movement therewith.

FIG. 6 of the drawings also best shows that the pallet P is preferably formed from a plurality of stretched out, substantially Z-shaped members 110 that are positioned in operative vertically overlapped association with each other to form a number of rectangular longitudinally extending channels C or boxes in the pallet P. A number of the Z-shaped members 110 are positioned in operative abutted association with each other and the laterally outermost pair of these Z-members are completed to form channels or tubes by means of edge angles 112 of right angle shape in section. Top and bottom plates 114 and 116, respectively, are secured to this center means formed between the Z-shaped members 110 and the angles 112 whereby a lightweight but sturdy unit is provided. Normally, the members 110 would be welded to each other at their abutting edges or surfaces and the top and bottom plates would be welded to the interior core and reenforcing center portion of the pallet. The pallet P can be made from a number of longitudinally extending end abutting sections, indicated by the lines 120, each extending the width of the pallet. The ends would be welded together and the top and bottom plates 114 and 116 could be continuous over the channels, tubes or boxes formed in the sections. By such a construction, sections of different strengths can be provided in the pallet.

It should be realized that in the accompanying drawings, a number of means are omitted or else are shown diagrammatically. Hence, the inflation means for the air bags are not shown in detail, while pneumatic or hydraulic fluid supply lines for the piston and cylinder assembly 40 are just indicated at 99. Naturally, the hydraulic fluid, or other fluid, used for expansion and contraction of the cylinder assembly 40 can be supplied from the tractor by suitable coupling lines extending therebetween and compressed air for the inflation of the air bag assemblies can likewise be provided from conventional air compressor supply means provided on the tractor. The controls could be mounted on the tractor and/or trailer, as desired.

Normally in use, the trailer assembly Z is used in its extended form as indicated in FIGS. 1 and 3 of the drawings. However, when initially running such a pole type trailer under a load support pallet and between the support legs thereon, it usually is preferable to have the cylinder assembly in its collapsed form wherein the shorter trailer can readily be centered in relation to the pallet and be backed in under a load support pallet P. Naturally, these load support pallets can be of any desired length and thus the trailer can likewise be adjusted in length for association with different size pallets. Furthermore, the trailer assembly could even be manually pushed in under a load pallet if desired and be engaged therewith prior to extending the cylinder assembly 40 for pallet lifting and transport action by the trailer.

It should be realized that the support leg assembly 14, as shown in FIGS. 1 through 4 of the drawings, particularly, may be modified to have the receiving channels 19 terminate flush with the lateral margins of the pallet whereby the vertically extending legs 18 would not protrude laterally beyond the other dimensions of the pallet whereby the legs could be carried in the pallet while in transit without any objectionable increase in width of the pallet. Any suitable construction can be used to recess these legs to be supported within the lateral margins of the pallet.

FIG. 8 of the drawings illustrates a modified pallet 130 which is provided with a king pin 131 at the front end thereof and a second dependent king pin 132 adjacent the rear end of the pallet for engaging the tractor and trailer for operatively positioning the pallet as hereinafter described.

A fragmentary portion of a tractor is indicated at 133 and it has a suitable lifting mechanism or unit secured between a portion of the frame of the tractor 133 and a support plate 135 for raising and lowering a fifth wheel plate 136. This fifth wheel plate is suitably pivotally positioned on a bracket 136a supported by a rearwardly extending cantilevered plate 137 secured to the support plate 135. Suitable support means (not shown) may extend between lateral marginal portions of the plates 135 and 137. A further novel element in this assembly is a gooseneck shaped pull bar 138 provided in the assembly. This pull bar 138 is pivotally secured to a suitable shaft or pin 139 which forms the center support and turning center for the fifth wheel plate 136. As indicated in the drawing, the pull bar 138 protrudes rearwardly from the tractor 133 and has a dependent end or lower section 140 which has a suitable member, such as a support bracket 141 secured thereto. The pull bar 138 hence is free for arcuate movement relative to the center of the fifth wheel plate 136.

The apparatus also includes a trailer unit 142 which has a piston 143 extending forwardly from a fluid actuated pressure cylinder 144 forming the main frame for the trailer unit insofar as a longitudinal frame means therefor is provided. The front end of the piston 143 carries a tongue 145 that is pivotally secured to the bracket 141 whereby pivotal movement in a vertical plane is provided between the piston and the fifth wheel plate. At the same time, the pull bar 138 is free to move in a horizontal plane when the tractor and trailer are going around a curve or having other turning forces applied to the trailer unit 142.

At the rear end of the cylinder 144, it is provided with a suitable axially extending connector 146 that is pivotally secured to a bracket 147 operatively engaged with a frame 148 of the wheel support assembly in the trailer. This frame 148 also positions a pair of laterally spaced brackets 149 and 150 that are adapted to engage, pivotally, support bars or tie rods 151 and 152 that extend respectively from the brackets 149 and 150 and are secured at their forward ends to a connector member 153 secured to the cylinder 144 forwardly from the rear end thereof. Thus, the entire wheel support frame 148, and means secured thereto, is free to pivot vertically about the rear end of the cylinder 144 while the front end of such piston and cylinder assembly likewise is free for pivotal movement in a vertical plane in relation to the longitudinal axis of the trailer assembly. At the same time, the tie rods 151 and 152 aid in maintaining the entire trailer unit including the wheel support frame and members mounted thereon operating as a unit for horizontal arcuate movement in a horizontal plane about the fifth wheel 136 provided on the tractor. Hence, common pivotal action is provided in the trailer assembly to such an extent that the pallet 130 is properly operatively positioned on the tractor and trailer at all times including turning actions, bumps and/or other forces applied thereto in transit.

By the construction shown in FIGS. 8 and 9, improved trailer action is obtained and better turning and lift and load carrying properties are obtained in the tractor trailer and pallet unit of the invention.

Yet a further feature of the structure shown is that a lift or load support plate 154 is provided in the wheel assembly and this load support plate has a fifth wheel formed at 155 in a rear portion of such plate and facing forwardly in the unit. The pallet 130 may have suitable longitudinally extending guides like those described hereinbefore in relation of FIGS. 1 and 4 for leading the rear king pin 132 into this fifth wheel 155 for operative engagement therewith when the front king pin 131 engages the fifth wheel 136 for two operative pivotal engagements between the pallet and the load support trailer whereby the pallet is retained against vertical movement in relation to the trailer but free to pivot in relation thereto.

A modified type of a lift assembly means for use in the trailer assembly is shown in FIGS. 10, 11 and 12. In this instance, a pair of longitudinally spaced supports 160 and 161 are secured to a portion of the frame 162 of the trailer wheel assembly and a lower enclosure 163 is formed around these supports 160 and 161. Then two air bags 164 and 165 of any conventional and suitable construction are provided and are secured to a top enclosure 166 that telescopically engages the lower enclosure 163. These air bags 164 and 165 are provided with any suitable inflation controls or valve means and are adapted, when deflated, to move down in between adjacent surfaces of the supports 160 and 161 and the adjacent wall of the upper enclosure 166 as it is telescopically received in the lower enclosure 163. Suitable guides 167 and 168 are secured to the enclosures to facilitate limited sliding movement therebetween.

FIG. 12 best shows that a pair of enclosures 166 and 166a are formed on opposite sides of the center line of the trailer wheel assembly and that transversely extending tie bars 171 and 172 extend therebetween. These tie bars aid in providing uniform vertical movement of the upper enclosures 166 to retain them in common horizontal positions when the air bags are inflated. Naturally, a load support plate like the plate 154 or one equivalent thereto is provided on the upper end of the enclosures and suitably secured thereto whereby load applied, as by the pallet, will be raised or lowered depending upon the inflation conditions of the air bags in the lift unit.

It will be realized that other stabilizing means than those in FIG. 12 can be provided to insure uniform inflation of all four air bags in any lift unit provided in the apparatus of the invention whereby the load support plates will be raised and lowered while maintained in a horizontal position.

If desired, a fixed length center pole may be substituted for the piston rods and cyliners shown in the trailers in the drawings.

The tractors shown are conventional and normally have their rear axles positioned forwardly of the fifth wheel plates.

For other lift means, hydraulic cylinders could be used, or electric motor driven screw jacks, or other known devices, as desired.

The guides between the pallet and trailer load support plates may be of any suitable nature including pins, which may be retractible, on the support plate engaging longitudinally extending grooves provided in the lower surface of the pallets.

By the present invention, relatively inexpensive but sturdy pole type trailers have been provided and they are stable under load transport action. This trailer can be used for moving a number of different load pallets, and the pallets are relatively inexpensive but sturdy so that when it is necessary to leave a load upon a pallet, the trailer can be disengaged therefrom and be used for transporting other load pallets to any desired location. Naturally, this greatly reduces the operating costs for load storage and transport since the one set of wheels, license plates, etc. required for the pole type trailer can be used almost continuously and any load storage action on a transport trailer is avoided and only inexpensive pallets are required for load storage. Thus, it is believed that the objects of the invention have been achieved.

While several complete embodiments of the invention have been disclosed herein, it will be appreciated that modification of these particular embodiments of the invention may be resorted to without departing from the scope of the invention as defined in the appended claims.

What is claimed is:

1. A pallet type load transport apparatus comprising in combination, a pallet having a plurality of load support legs operably secured thereto at edge portions thereof, and a tractor-trailer assembly adapted to be moved under said pallet, said tractor having a fifth wheel plate to engage said pallet and secure it to said tractor, said trailer including a center pole means and a wheel means assembly secured to the rear end of said center pole means, a load support platform on said wheel means assembly, and inflatable means connecting said load support platform to raise and lower the same to engage and support the rear end of said pallet, and inflatable cylinder means connecting said fifth wheel to said tractor for raising and lowering the same and the end of any said pallet supported thereby.

2. A pallet type load transport apparatus as in claim 1 where said trailer wheel means assembly load support platform has a fifth wheel plate provided thereon, said pallet has dependent king pins on the front end and adjacent the rear end thereof, and said fifth wheel plates engage said pallet to secure it to said tractor and trailer for load support thereby.

3. A pallet type load transport apparatus as in claim 1 where a pull bar means is pivotally secured to said tractor on the center of said fifth wheel plate, said center pole means is pivotally secured to said pull bar means for vertical pivotal movement therebetween and said trailer and pallet both turn in a horizontal direction centered on said fifth wheel.

4. A pallet type load transport apparatus as in claim 1 where means pivotally secure the rear end of said center pole means to said wheel means assembly for vertical movement therebetween, and tie bar means extend from laterally spaced portions of said wheel means assembly to said center pole means spaced from the rear end thereof to aid in maintaining said center pole means perpendicular to the transverse axis of said wheel means assembly at all times.

5. A pallet type load transport apparatus as in claim 2 where a pull bar means is pivotally secured to said tractor on the center of but below the said fifth wheel plate there, said center pole means is pivotally secured to said pull bar means for vertical pivotal movement therebetween, both said pallet and said trailer turn in a horizontal direction centered on said tractor fifth wheel, and said center pole means is pivotally secured to said wheel means assembly.

6. A pallet type load transport apparatus as in claim 1 where said trailer wheel assembly has a frame and four vertically movable inflatable means extend between said frame and load support platform, and stabilizer means operatively engage and extend between said inflatable means and said frame.

7. A pallet type load transport apparatus as in claim 6 where said stabilizer means include a pair of lower enclosures, a pair of upper enclosures each engaging a pair of said inflatable means and each slidably engaging a lower enclosure, and means securing said upper enclosures together for unitary movement thereof.

8. A pallet type load transport apparatus as in claim 1 where said pallet has a pair of longitudinally extending guide members adjacent its rear end on the under surface thereof, said load support platform being engageable between said guide members, and interengaging means on said pallet and load support platform to retain said pallet against upward movement.

9. A pallet type load transport apparatus comprising in combination, a pallet having a plurality of load support legs operably secured thereto at edge portions thereof, a trailer assembly adapted to be moved under said pallet, and a tractor is provided and has a vertically movable fifth wheel thereon, said trailer including a center pole assembly and a wheel means assembly secured to the rear end thereof, a load support platform carried on said wheel means assembly, lifting means connecting said load support platform to said wheel assembly to raise and lower the same to engage and support the rear end of said pallet, and connecting means are pivotally centered on the center axis of said fifth wheel and connect to said center pole assembly of said trailer to pull the same centered on said fifth wheel axis.

10. A pallet type load transport apparatus as in claim 9 where a front pair of said support legs are provided and are adjustable laterally of said pallet.

11. A pallet type load transport apparatus as in claim 9 where said trailer wheel means assembly load support platform has a fifth wheel plate provided thereon, said pallet has a dependent king pin adjacent the rear end thereof, said fifth wheel plate engages said pallet to secure it to said trailer for load support thereby, and said trailer includes means pivotally securing said center pole assembly to said wheel assembly means.

12. A pallet type load transport apparatus as in claim 9 where means pivotally connect said wheel assembly means to said center pole assembly.

* * * * *